UNITED STATES PATENT OFFICE.

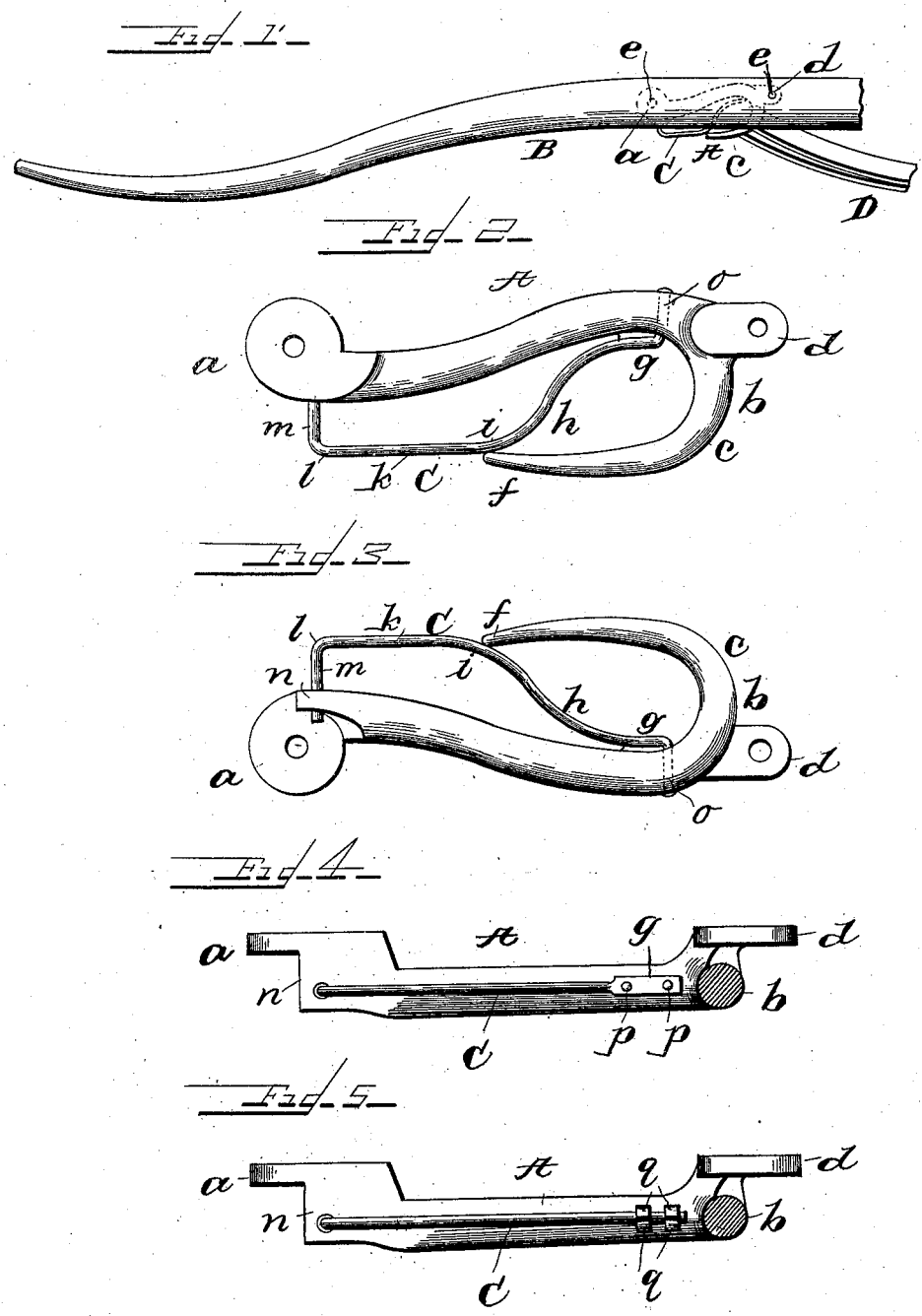

CLARENCE A. PACKARD, OF RICHMOND, VIRGINIA, ASSIGNOR OF ONE-HALF TO FRED H. HOLLADAY, OF SAME PLACE.

HOLDBACK FOR VEHICLES.

SPECIFICATION forming part of Letters Patent No. 503,158, dated August 15, 1893.

Application filed February 17, 1893. Serial No. 462,723. (No model.)

*To all whom it may concern:*

Be it known that I, CLARENCE A. PACKARD, a citizen of the United States, residing at Richmond, in the county of Henrico and State of Virginia, have invented certain new and useful Improvements in Holdbacks for Vehicles; and I do hereby declare the following to be a full, clear, and exact description of the invention, such as will enable others skilled in the art to which it appertains to make and use the same.

My invention relates to holdbacks for vehicles, and has for its object certain improvements in the construction of that class of holdbacks which are designed to automatically release the holdback-straps in case the horse becomes accidentally detached from the whiffletree, or in the event of the whiffletree breaking, and the horse becoming freed from the vehicle.

The invention will be fully disclosed in the following specification and claims.

In the accompanying drawings, which form part of this specification, Figure 1, is a top plan view of part of a thill provided with my improved holdback, with a holdback-strap attached; Fig. 2, a like view of the holdback detached and on an enlarged scale; Fig. 3, an inverted plan of the same, and Figs. 4 and 5 show modifications of the spring for securing the holdback-strap.

Reference being had to the drawings and the letters thereon, A indicates my improved holdback, which is provided at one end with a lug $a$, and at the opposite end on the curved portion $b$ of the hook $c$ with a lug $d$, by which the holdback is attached to the under side of a thill B by suitable screws $e$ $e$.

The lug $d$ on the hook portion of the holdback distributes the strain brought to bear upon the screws $e$ $e$ and reduces the leverage upon the rear screw to the minimum, as this leverage extends only from the bill $f$ or free end of the hook to the lug $d$ and produces a firm and rigid connection with the thill.

C indicates a spring to prevent accidental detaching of the holdback-strap D from the holdback. This spring is secured to the inside of the shank $g$ of the hook, and extending forward is curved at $h$ to give tension to the spring, and said curve extends to the end of the bill $f$ of the hook, which prevents the holdback-strap D getting behind the spring and preventing an automatic releasing of the holdback-strap from the holdback when the horse should be released from the vehicle. From the point $i$ where the spring engages the end of the hook, the spring is bent or curved in the reverse direction and forms a straight portion $k$, and is again bent at $l$ to form the arm $m$ which extends through the flange $n$ on the under side of the lug $a$.

To insert the holdback-strap D without unbuckling, pressure is applied to the part $k$ of the spring C which moves it out of contact with the end of the bill $f$ of the hook, when the strap may be readily and easily inserted.

The spring C may be secured to the hook by drilling a hole $o$ and inserting one end of the spring and riveting it therein, as shown in Figs. 2 and 3, or it may be secured by rivets $p$ $p$ as shown in Fig. 4, or one end may be inserted between lugs $q$ $q$ and the lugs bent down upon the spring as shown in Fig. 5.

The spring C is preferably made of round steel wire to prevent chafing on the holdback-strap.

It is obvious that the hook and its spring may be applied to neck-yoke-straps or as a snap-hook for various purposes without departing from the spirit of my invention.

Having thus fully described my invention, what I claim is—

1. A holdback for vehicles provided with a hook, a lug at the end of the shank, and a lug on the curved portion of the hook for attaching the holdback to a thill.

2. A holdback for vehicles provided with a hook, separate lugs on the end of the shank and the curved portion of the hook and a spring secured to the inside of the curved portion of the hook and extending to the end of the bill of the hook.

3. The combination of a hook a spring secured to the inside of the curved portion of the shank of the hook, and curved outward from the shank to the end of the hook and extending beyond said end.

4. A holdback for vehicles provided with a hook, a lug at one end of the hook and a lug on the curved portion of the hook, in combination with a spring secured to the inside of the curved portion of the shank of the hook curved outward to the bill of the hook extending beyond the hook, and its free end supported in a flange under the front lug.

5. A holdback for vehicles provided with a flange $n$, a hook $c$, separate lugs $a$ and $d$ at opposite ends of the hook, in combination with a spring secured to the shank $g$ on the inside of the hook and having an arm $m$ to engage flange $n$.

In testimony whereof I affix my signature in presence of two witnesses.

CLARENCE A. PACKARD.

Witnesses:
D. C. REINOHL,
H. B. REINOHL.